(12) United States Patent
Kawamura et al.

(10) Patent No.: US 12,553,143 B2
(45) Date of Patent: Feb. 17, 2026

(54) SHOCK ABSORBER AND METHOD FOR MANUFACTURING SHOCK ABSORBER

(71) Applicant: Hitachi Astemo, Ltd., Hitachinaka (JP)

(72) Inventors: Toshinori Kawamura, Tokyo (JP); Hiroshi Kanemoto, Tokyo (JP); Hiroshi Nakano, Hitachinaka (JP); Akihito Hoshino, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 401 days.

(21) Appl. No.: 18/022,730

(22) PCT Filed: May 20, 2021

(86) PCT No.: PCT/JP2021/019224
§ 371 (c)(1),
(2) Date: Feb. 22, 2023

(87) PCT Pub. No.: WO2022/044451
PCT Pub. Date: Mar. 3, 2022

(65) Prior Publication Data
US 2023/0313403 A1    Oct. 5, 2023

(30) Foreign Application Priority Data

Aug. 27, 2020  (JP) ................................. 2020-143519

(51) Int. Cl.
*C25D 5/00*        (2006.01)
*C25D 3/06*        (2006.01)
(Continued)

(52) U.S. Cl.
CPC ................ *C25D 5/611* (2020.08); *C25D 3/06* (2013.01); *C25D 7/00* (2013.01); *F16F 9/19* (2013.01);
(Continued)

(58) Field of Classification Search
CPC .......... F16F 9/19; F16F 9/32; F16F 2228/007; F16F 2222/12; F16F 2230/02;
(Continued)

(56) References Cited

U.S. PATENT DOCUMENTS 6,189,663 B1 *   2/2001  Smith ...................... C23C 4/131
                                                              188/322.22
6,329,071 B1    12/2001  Kobayashi et al.
(Continued)

FOREIGN PATENT DOCUMENTS

CN          100549189 C   * 10/2009  ................ C21D 6/02
CN          104039480 A   *  9/2014  ............. B22D 25/06
(Continued)

OTHER PUBLICATIONS

Office Action issued in corresponding Japanese Patent Application No. 2020-143519, with English Machine Translation dated Aug. 15, 2023 (11 pages).

(Continued)

*Primary Examiner* — Robert A. Siconolfi
*Assistant Examiner* — San M Aung
(74) *Attorney, Agent, or Firm* — Foley & Lardner LLP

(57) ABSTRACT

Provided is a shock absorber in which trivalent chromium is used to achieve both high hardness and low frictional force at a high level without using hexavalent chromium which is suspected of causing damage to the human body and the environment, and a method for manufacturing the shock absorber.

A shock absorber (100) of the present invention includes: a cylinder (1) which is filled with hydraulic oil (3); a piston rod (2) which is movable in the cylinder (1); and an oil seal (8) which is fixed to the cylinder (1) and slides on the piston rod (2), in which a hard layer mainly containing chromium obtained from a trivalent chromium plating bath is provided (Continued)

on a surface of the piston rod (2), and the hard layer contains both a crystalline material and an amorphous material, and also contains an additive other than chromium.

8 Claims, 3 Drawing Sheets

(51) Int. Cl.
　　　C25D 7/00　　　(2006.01)
　　　F16F 9/19　　　(2006.01)
　　　F16F 9/32　　　(2006.01)
　　　B60G 13/08　　　(2006.01)
(52) U.S. Cl.
　　　CPC ............ F16F 9/3221 (2013.01); B60G 13/08 (2013.01); B60G 2202/24 (2013.01); B60G 2206/41 (2013.01); B60G 2206/70 (2013.01); B60G 2206/80 (2013.01); B60G 2800/162 (2013.01); F16F 2222/12 (2013.01); F16F 2224/0208 (2013.01); F16F 2226/02 (2013.01); F16F 2228/007 (2013.01); F16F 2230/02 (2013.01)
(58) Field of Classification Search
　　　CPC .......... B60G 2206/70; B60G 2800/162; B60G 2206/41; B60G 2206/80; B60G 2202/24; B60G 13/08; C25D 3/06; C25D 5/611; C25D 5/48; C25D 5/615; C25D 7/00
　　　USPC ........................................................ 188/297
　　　See application file for complete search history.

(56) References Cited

U.S. PATENT DOCUMENTS

| | | |
|---|---|---|
| 2008/0274373 A1 | 11/2008 | Takahashi |
| 2009/0114544 A1 | 5/2009 | Rousseau et al. |
| 2019/0040540 A1 | 2/2019 | Raisa |
| 2020/0017986 A1 | 1/2020 | Walter et al. |

FOREIGN PATENT DOCUMENTS

| | | | | |
|---|---|---|---|---|
| CN | 204026118 U | * | 12/2014 | |
| CN | 108203824 A | * | 6/2018 | ......... C22C 32/0005 |
| DE | 69027428 T2 | | 2/1997 | |
| DE | 19953318 A1 | | 6/2000 | |
| EP | 0 456 834 B1 | | 6/1996 | |
| JP | S61-021439 A | | 1/1986 | |
| JP | H06-010183 A | | 1/1994 | |
| JP | 2000-001789 A | | 1/2000 | |
| JP | 2009216235 A | * | 9/2009 | |
| JP | 2009293773 A | * | 12/2009 | |
| JP | 2010-540781 A | | 12/2010 | |
| JP | 2018-532879 A | | 11/2018 | |
| WO | WO-2006/043507 A1 | | 4/2006 | |
| WO | WO-2012/133613 A1 | | 10/2012 | |
| WO | WO-2018003247 A1 | * | 1/2018 | .......... C10M 141/10 |
| WO | WO-2018018149 A1 | * | 2/2018 | ................ F16J 7/00 |

OTHER PUBLICATIONS

Publications and Other Forms of Submission in corresponding Japanese Patent Application No. 2020-143519, with English Machine Translation dated Jul. 3, 2023 (14 pages).

Ryokichi Shimpo, "Hard Chromium Plating Using Trivalent Chromium Baths", Surface Technology, 2018, pp. 219-225, vol. 69, No. 6, https://www.jstage.jst.go.jp/article/sfj/69/6/69_219/_pdf/-char/ja (7 pages).

Tsutomu Morikawa, "A Scientific Approach to Chromium Electroplating", Surface Technology, 2005, pp. 308-314, vol. 56, No. 6, https://www.jstage.jst.go.jp/article/sfj/56/6/56_6_308/_pdf/-char/ja (7 pages).

English Translation of International Search Report Issued in International Application No. PCT/JP2021/019224 dated Jul. 27, 2021.

German Office Action issued in corresponding DE Patent Application No. 112021003528.2, dated Apr. 2, 2025 with English translation (15 pages).

* cited by examiner

SHOCK ABSORBER AND METHOD FOR MANUFACTURING SHOCK ABSORBER

TECHNICAL FIELD

The present invention relates to a shock absorber and a method for manufacturing a shock absorber.

BACKGROUND ART

A hard chromium plating film has excellent characteristics in abrasion resistance, corrosion resistance, slidability, and the like, and thus is widely used in various industrial fields such as automotive components such as suspension rods, piston rings, and brake pistons, shafts of hydraulic equipment, and gravure rolls of printing equipment. For example, PTL 1 discloses a shock absorber in which a surface hard layer such as a chromium plating film or a nickel plating film is provided on a peripheral surface with no cylinder member in order to stabilize the frictional resistance of the shock absorber.

Conventionally, a hexavalent chromium plating bath using hexavalent chromium as a chromium component has been used to form a hard chromium plating film. However, in recent years, hexavalent chromium has been designated as a substance of very high concern in environmental regulations (such as Registration, Evaluation, Authorization and Restriction of Chemicals (REACH)) and effluent regulations, and the reduction of its use is desired worldwide. In view of such a background, development of a hard chromium plating film using a trivalent chromium compound with less toxicity has been advanced as an alternative technique for the hard chromium plating film using hexavalent chromium. For example, PTL 2 discloses a hard trivalent chromium plating film which is capable of providing hardness and abrasion resistance equivalent to those of a hard hexavalent chromium plating film, in order to replace hexavalent chromium plating baths.

CITATION LIST

Patent Literature

PTL 1: JP 61-21439 A
PTL 2: JP 2010-540781 A

SUMMARY OF INVENTION

Technical Problem

For example, a sliding component such as a suspension rod disclosed in PTL 1 needs to achieve both hardness and slidability such as frictional force at a high level. It is known that, in the case of the hard trivalent chromium plating film, a hardness of 800 HV or greater is obtained even after plating, similarly to the case of hard hexavalent chromium plating, and chromium carbide is formed by additionally performing a heat process, thereby obtaining a hardness of 1000 HV or greater. However, characteristics other than hardness and abrasion resistance have not been evaluated so far, and further studies are required to improve the slidability such as frictional force required for a sliding component such as a suspension rod.

In view of the above circumstances, an object of the present invention is to provide a shock absorber in which trivalent chromium is used to achieve both high hardness and low frictional force at a high level without using hexavalent chromium which is suspected of causing damage to the human body and the environment, and a method for manufacturing the shock absorber.

Solution to Problem

One aspect of the present invention for achieving the above object is a shock absorber including: a cylinder which is filled with hydraulic oil; a piston rod which is movable in the cylinder; and an oil seal which is fixed to the cylinder and slides on the piston rod, in which a hard layer mainly containing chromium obtained from a trivalent chromium plating bath is provided on a surface of the piston rod, and the hard layer contains both a crystalline material and an amorphous material, and also contains an additive other than the chromium.

Another aspect of the present invention for achieving the above object is the method for manufacturing a shock absorber which includes a plating step of forming a plating film including a hard layer mainly containing trivalent chromium on a surface of the piston rod, in which the plating step is performed at a cathode current density of 100 A/dm$^2$ or greater in a plating bath containing a trivalent chromium salt, a carboxylic acid, a pH buffering agent, and a conductive salt and having a pH of ≤0.1.

A more specific configuration of the present invention is described in the claims.

Advantageous Effects of Invention

According to the present invention, it is possible to provide a shock absorber in which trivalent chromium is used to achieve both high hardness and low frictional force at a high level without using hexavalent chromium which is suspected of causing damage to the human body and the environment, and a method for manufacturing the shock absorber.

Problems, configurations, and effects other than those described above will be clarified by the description of embodiments below.

DESCRIPTION OF EMBODIMENTS

Hereinafter, a shock absorber and a method for manufacturing a shock absorber according to one embodiment of the present invention will be described. The present invention is not to be construed as being limited thereto, and improvements can be made based on the knowledge and findings of those skilled in the art without departing from the scope of the present invention.

Basic Idea of Present Invention

In general, regarding a hexavalent chromium plating film used as a hard layer, much additive other than a chromium metal salt is not contained in a plating bath component, and thus the content of the additive in the plating film is small, and the plating film tends to be crystalline. In addition, since the coefficient of friction of chromium metal is also small, the hexavalent chromium plating film has been widely used as a hard plating film having high hardness and excellent abrasion resistance.

Meanwhile, a trivalent chromium plating film that has been studied as an alternative technique for the hard hexavalent chromium plating film contains, as plating bath components, various additives such as a complexing agent, a conductive salt, a pH buffering agent, and a crystallization agent, in addition to the trivalent chromium compound, in order to improve the deposition stability of the plating bath and the film hardness. Accordingly, unlike the crystalline hexavalent chromium plating film, the trivalent chromium plating film contains many additives such as carbon, nitrogen, oxygen, and hydrogen, in addition to chromium, and thus is basically amorphous. Consequently, it has been found that the trivalent chromium plating film is difficult to improve the smoothness by polishing after plating as compared with the hexavalent chromium plating film, and the trivalent chromium plating film is higher in frictional force than the hard hexavalent chromium plating film.

The present inventors have intensively studied to achieve both high hardness and low frictional force at a high level in the trivalent chromium plating film. As a result, the present inventors have found that the ratio of amorphous and crystalline components in the hard trivalent chromium plating film is adjusted and an additive other than chromium is contained in the plating film, and thus it is possible to obtain a plating film whose surface roughness and frictional force are reduced, and is preferred as a shock absorber. The present invention is based on this finding.

Hereinafter, the shock absorber of the present invention will be described in detail.

[Outline of Shock Absorber]

Figure 1:
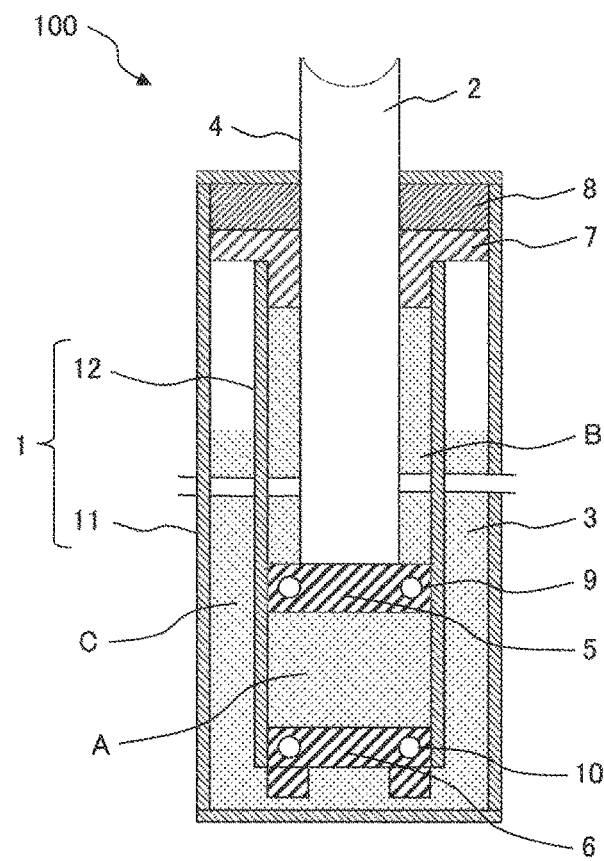
FIG. 1 is a schematic cross-sectional view illustrating an example of a shock absorber of the present invention.

FIG. 1 is a schematic cross-sectional view illustrating an example of a shock absorber of the present invention. FIG. 1 exemplifies an automobile hydraulic shock absorber as a shock absorber. As illustrated in FIG. 1, a shock absorber 100 of the present invention is a twin-tube type and includes: a cylinder 1 which includes a tube-like outer cylinder 11 having a bottom portion and an inner cylinder 12 provided coaxially inside the outer cylinder 11; a piston rod 2 which is movable relatively to the cylinder 1; and an oil seal 8 which is fixed to the cylinder 1 and slides on the piston rod 2. A hydraulic oil for hydraulic system 3 and a gas for volume compensation are injected into the inner cylinder 12 and a reservoir chamber C between the inner cylinder 12 and the outer cylinder 11.

A hard layer 4 is provided on the surface of the piston rod 2, a piston 5 is fixed to one end side of the piston rod 2 inserted into the inner cylinder 12, and the other end is disposed so as to protrude from the cylinder 1. The outer peripheral portion of the piston 5 is slidably fitted to the inner surface of the inner cylinder 12. A bottom valve 6 is fixed to a lower end of the inner cylinder 12, and a rod guide 7 that slidably guides the piston rod 2 is fixed to an upper end of the inner cylinder 12. A through hole is provided at the center of the rod guide 7, and the piston rod 2 is inserted into the through hole. The oil seal 8 is fixed to an upper portion of the outer cylinder 11, and the inside of the outer cylinder 11 is hermetically sealed with the oil seal 8. The oil seal 8 and the piston rod 2 are fitted to each other, as a result of which the oil seal 8 prevents the hydraulic oil for hydraulic system 3 from leaking to the outside of the cylinder 1 through the gap between the piston rod 2 and the rod guide 7.

As can be seen from FIG. 1, in the automobile hydraulic shock absorber 100, the piston 5 separates the inside of the inner cylinder 12 into an oil chamber A and an oil chamber B. The bottom valve 6 separates the reservoir chamber C between the inner cylinder 12 and the outer cylinder 11 from the oil chamber A. The piston 5 is provided with a damping force generating mechanism 9 including a valve. When the piston rod 2 moves to the extension side (the piston rod 2 moves upward in FIG. 1), the damping force generating mechanism 9 generates a predetermined damping force by opening the valve to form a flow path having a small cross-sectional area between the oil chamber A and the oil chamber B and restricting the flow of the hydraulic oil for hydraulic system 3. The bottom valve 6 is provided with a damping force generating mechanism 10. The damping force generating mechanism 10 includes a flow path having a small cross-sectional area formed in the bottom valve 6. When the piston rod 2 moves to the reduction side (the piston rod 2 moves downward in FIG. 1), the hydraulic oil for hydraulic system 3 in the oil chamber A flows to the reservoir chamber C through the flow path having a small cross-sectional area, and thus a damping force is generated.

[Hard Layer]

The hard layer 4 of the present invention is a plating film which contains a main component: trivalent chromium, contains both a crystalline material and an amorphous material, and contains an additive other than chromium. Such quality of the chromium plating film is adopted, so that it is possible to reduce the surface roughness in polishing after plating, and it is possible to reduce the coefficient of friction with oil. Hence, the hard layer 4 including a smooth hard trivalent chromium plating film having a low coefficient of friction is provided on the surface of the piston rod 2, thereby realizing the automobile hydraulic shock absorber 100 having a low frictional force.

[Additive of Hard Trivalent Chromium Plating Film]

The hard trivalent chromium plating film contains additives such as hydrogen, carbon, nitrogen, and oxygen.

It is presumed that these additives are derived from organic components, such as a carboxylic salt, a pH buffering agent, and a conductive salt contained in the plating bath. Further, it has been confirmed that the additive content varies depending on the plating process conditions, and particularly greatly contributes to the pH and current density conditions. The reason for this is presumed to be that the current density (reduction rate) and pH (complex formation) are influenced by the uptake of the additive when chromium is precipitated.

The additive content in the plating film is preferably 2.3 mass % or greater and 4.3 mass % or less. The additive content is 2.3 mass % or greater, whereby an effect of reducing the coefficient of friction can be obtained. This is presumed to be because the additive causes chemical adsorption with the oil in the shock absorber to improve the oil retention on the surface of the plating film. Meanwhile, it has been confirmed that the surface roughness Rz after polishing after plating tends to increase as the additive content increases. This is presumed to be because the additive contained in the plating film inhibits polishing and reduces smoothness. Therefore, the additive content of the hard trivalent chromium plating film of the present invention is preferably 2.3 mass % or greater and 4.3 mass % or less.

[Crystallization Rate of Hard Trivalent Chromium Plating Film]

The crystallization rate (degree of crystallization) of the hard trivalent chromium plating film determined by the following equation is preferably from 5 to 26%. A correlation with the additive content of the plating film has been observed, and it has been confirmed that the crystallization rate tends to decrease as the additive content increases. This is presumed to be because the additive lowers the crystallinity. As a result of the experiment, from the correlation between the additive content and the crystallization rate, the crystallization rate has been from 5 to 26% when the additive content of the hard trivalent chromium plating film capable of providing above-mentioned low frictional force is 2.3 mass % or greater and 4.3 mass % or less.

$$\text{Crystallization rate (peak integral intensity ratio)} = (\text{crystalline}/(\text{crystalline+amorphous})) \times 100\% \quad \text{(Equation 1)}$$

The integral intensity ratio in the above (Equation 1) is a value determined at 2θ: 30 to 140°, crystalline half width: <3, and amorphous half width: ≥3 in X-ray diffraction (XRD) analysis.

[Hardness of Hard Trivalent Chromium Plating Film]

The hardness of the hard trivalent chromium plating film is preferably 750 HV or greater, which is equivalent to industrial hexavalent chromium (JIS (Japanese Industrial Standards) H 8615), but is preferably 800 HV or greater in order to improve the abrasion resistance of the piston rod. The hardness of the hard trivalent chromium plating film of the present invention can be further increased by performing a heat process after plating.

[Surface Roughness of Hard Trivalent Chromium Plating Film]

The surface roughness (Rz) of the hard trivalent chromium plating film is preferably 0.6 μm or less.

The surface roughness Rz after polishing is set to 0.6 or less, so that it is possible to reduce the frictional force of the hard trivalent chromium plating film of the present invention to equal to or less than that of the hard hexavalent chromium. Note that the polishing method is not particularly limited, but super finishing using a polishing film is preferred.

[Method for Manufacturing Shock Absorber]

In the method for manufacturing a shock absorber of the present invention, the hard layer 4 including the hard trivalent chromium plating film as described above is plated on the piston rod 2 of the shock absorber. As described above, the plating bath for the hard trivalent chromium plating film contains components such as a main component: trivalent chromium salt, an additive: complexing agent, a pH buffering agent, and a conductive salt. As the trivalent chromium salt, chromium chloride, chromium sulfate, basic chromic sulfate, or the like can be used, and chromium chloride is particularly preferred. As the complexing agent, a carboxylic salt such as glycine, formic acid, oxalic acid, or acetic acid can be used, and glycine is particularly preferred. As the pH buffering agent, boric acid, citric acid, or the like can be used, and boric acid is particularly preferred. As the conductive salt, ammonium chloride, ammonium sulfate, ammonium sulfamate, or the like can be used, and ammonium chloride is particularly preferred.

The pH of the plating bath is preferably 0.1 or less because the strong acidity is favorable. When the pH is 4.0 or greater, a plating film containing both a crystalline material and an amorphous material cannot be obtained. The current density should be higher, and is preferably 100 A/dm² or greater. When the current density is 50 A/dm² or less, a plating film containing both a crystalline material and an amorphous material cannot be obtained even when the pH is set to 0.1. This is presumed to be because the crystallization rate is influenced by the current density (reduction rate) and the pH (complex formation) as described above.

The plating bath temperature and the stirring method are not particularly limited, and the temperature is from 10 to 90° C., and air, a stirring bar, and the like can be used in the stirring method. As an anode material, a material having good insolubility, such as Pt, Ti, Ir, or carbon can be used.

In the embodiment described above, the automobile hydraulic shock absorber including the hard trivalent chromium plating film on the surface of the piston rod 2 has been described, but it is possible to adopt a two-layer structure in which a nickel plating film is provided on an intermediate layer between the piston rod 2 and the hard trivalent chromium plating film in accordance with the specification of the corrosion resistance required for products. The hard trivalent chromium plating film of the present invention can also be provided on a sliding portion other than the surface of the piston rod 2. For example, the plating film may be provided on a surface of an inner cylinder 21 serving as a sliding surface with respect to the piston 5.

EXAMPLES

Hereinafter, there will be described examples in which the hard layer 4 including the hard trivalent chromium plating film is formed on the surface of the piston rod 2, and the crystallization rate, the surface roughness Rz, the hardness, and the frictional force are evaluated.

Examples 1 to 3

In Examples 1 to 3, 20 μm of hard trivalent chromium was formed on surfaces of copper plates to produce test pieces for the additive analysis and the crystallization rate measurement. Further, test pieces for the hardness measurement, the surface roughness measurement after polishing, and the frictional force evaluation were produced in which a 10 μm-thick nickel plating film was formed on the surface of a carbon steel piston rod, and a 10 μm-thick hard trivalent chromium plating film was formed on the nickel plating film.

A Watts bath was used for formation of the nickel plating film. For the formation of the hard trivalent chromium plating film, a plating bath containing a trivalent chromium salt, a complexing agent, a pH buffering agent, and a conductive salt as main components was used. The plating treatment conditions were as follows: pH of 0.1, current density of 100 to 400 A/dm2, and temperature of 50° C. Pt and Ti were used as the anode materials. The piston rod test pieces were subjected to super finishing with a polishing film after plating processing.

Comparative Example 1

A test piece was produced in which carbon steel was used as a substrate and a hard hexavalent chromium plating film was formed on the surface of the substrate. 20 μm of hard trivalent chromium was formed on the surface of a copper plate to produce a test piece for the additive analysis and the crystallization rate measurement. Further, a test piece for the hardness measurement, the surface roughness measurement after polishing, and the frictional force evaluation was produced in which a 20 μm-thick hard hexavalent chromium plating film was formed on the surface of a carbon steel piston rod.

A HEEF bath was used to form the hard hexavalent chromium plating film. The plating treatment conditions were as follows: current density of 60 A/dm², and temperature of 60° C. A lead alloy was used as the anode material. The piston rod test pieces were subjected to super finishing with a polishing film after plating processing.

Comparative Example 2

In Comparative Example 2, a test piece was produced in the same manner as in Example 1 using the conventional hard trivalent chromium plating film. For the formation of the conventional hard trivalent chromium plating film, a plating bath containing a trivalent chromium salt, a complexing agent, a pH buffering agent, and a conductive salt as main components was used. The plating treatment conditions were as follows: pH of 5.5, current density of 40 A/dm², and temperature of 50° C. Pt and Ti were used as the anode materials. The piston rod test pieces were subjected to super finishing with a polishing film after plating processing.

sis conditions were as follows: a radio frequency of 35 W, a pulse frequency of 100 Hz, and gas type Ar.

[Measurement of Surface Roughness]

The surface roughness of the plating film after polishing was measured using a contact-type surface roughness measuring device (product name: SURFCOM 1500 DX, manufactured by TDS Co., Ltd.). As for measurement conditions, the measurement distance was 4 mm in accordance with JIS B0633.

[Measurement of Hardness]

A Vickers hardness tester was used for hardness measurement. As for the measurement conditions, the load was 25 gf and the load holding time was 15 s.

[Evaluation of Frictional Force]

The micro-vibration test was used for evaluation of the frictional force between the piston rod and the oil seal. In the test configuration, only the piston rod and the oil seal were used, and they were made upright. The test conditions were as follows: presence of gas and oil, sliding width of ±1 mm, and frequency of 10 Hz.

[Results of Evaluating Characteristics]

Table 1 shows the additive content, crystallization rate, hardness, surface roughness after polishing, and frictional force of Examples 1 to 3 and Comparative Examples 1 and 2.

TABLE 1

|  | Plating bath | Additive content (mass %) | Main additive | Crystallinity | Crystallization rate (%) | Surface roughness after polishing Rz (μm) | Hardness (HV) | Frictional force (N) |
| --- | --- | --- | --- | --- | --- | --- | --- | --- |
| Example 1 | Hard trivalent chromium | 4.3 | H, C, N, O | Crystallinity, amorphous | 5 | 0.58 | 894 | 39.5 |
| Example 2 | Hard trivalent chromium | 3.8 | H, C, N, O | Crystallinity, amorphous | 10 | 0.54 | 886 | 34.5 |
| Example 3 | Hard trivalent chromium | 2.3 | H, C, N, O | Crystallinity, amorphous | 26 | 0.52 | 827 | 33.4 |
| Comparative Example 1 | Hard hexavalent chromium | 0.4 | H, C, N, O, S | Crystalline | 100 | 0.42 | 974 | 47.3 |
| Comparative Example 2 | Hard trivalent chromium | 21.4 | H, C, N, O, S | Amorphous | 0 | 0.79 | 919 | 70.6 |

[Measurement of Crystallization Rate]

The crystallization rate of the hard chromium plating film was measured by XRD analysis. The measurement conditions were as follows: X-ray source of Cu and diffraction angle of 20≤2θ≤140°. The crystallization rate calculation was based on the peak integral intensity ratio determined in a range of 30≤2θ≤140°, and the crystallization rate was determined as a ratio of the total integral intensity of crystalline peaks to the total integral intensity of all peaks (see Equation 1). The distinction between crystalline and amorphous was made on the half width of the peak, and the half width of <3 was defined as crystalline, and the half width of ≥3 was defined as amorphous.

Crystallization rate (peak integral intensity ratio %)= (crystalline/(crystalline+amorphous))×100    (Equation 1)

[Additive Analysis]

For the additive analysis in the chromium plating film, semi-quantitative analysis was performed using glow discharge optical emission spectrometry (GDOES). The analy- (Additive Components and Additive Content)

Main additive components of Examples 1 to 3 were hydrogen (H), carbon (C), nitrogen (N), and oxygen (O), and the additive content was from 2.3 to 4.3 mass %. Meanwhile, main additive components of Comparative Examples 1 and 2 include sulfur (S), in addition to hydrogen, carbon, nitrogen, and oxygen. The additive content in Comparative Example 1 was 0.4 mass % and the additive content in Comparative Example 2 was 21.4 mass %. As a result, it was found that the additive content of the hard trivalent chromium plating film of the present invention was larger than that of the hard hexavalent chromium plating film and smaller than that of the conventional trivalent chromium plating film. Further, it was found that the additive components of the hard trivalent chromium plating film of the present invention did not contain a sulfur component, unlike the hard hexavalent chromium plating film and the conventional hard trivalent chromium plating film.

(Crystallinity and Crystallization Rate)

Figure 5:
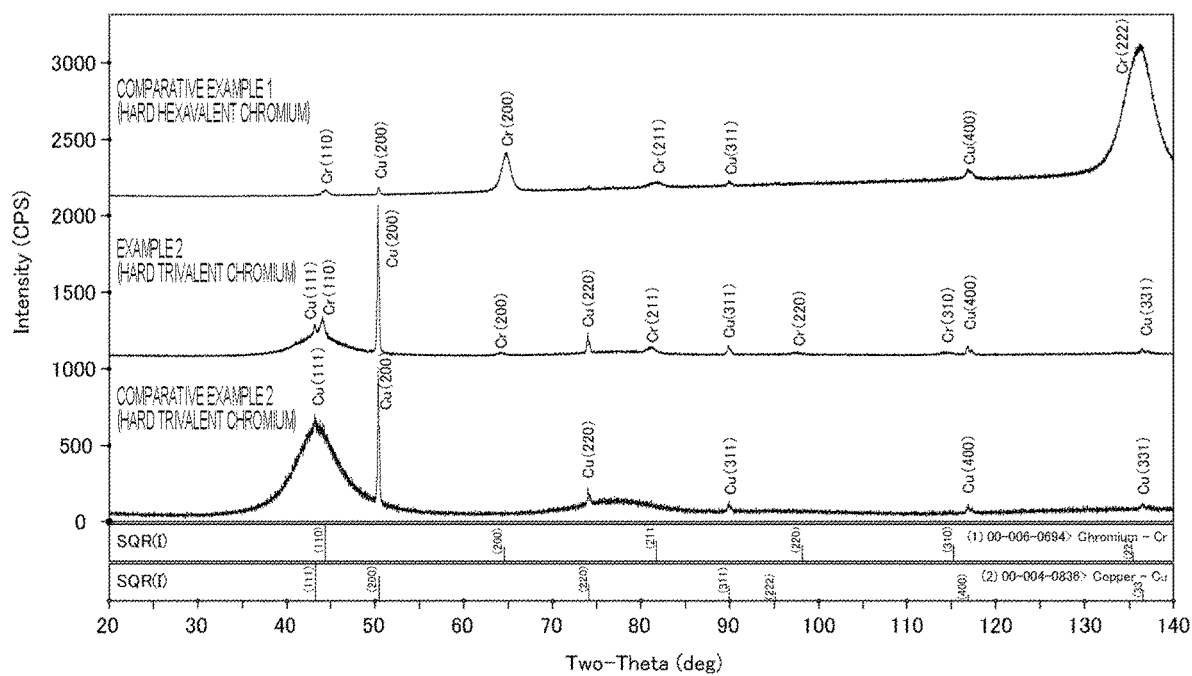
FIG. 5 is a graph illustrating XRD analysis results of Example 2 and Comparative Examples 1 and 2.

FIG. 5 is a graph illustrating XRD analysis results of Example 2 and Comparative Examples 1 and 2. As illustrated in FIG. 5, in Comparative Example 1, only a sharp peak derived from chromium is detected, and thus it is inferred that the film is crystalline. Since a peak (222) is remarkable, it is inferred that the film has orientation with preferential orientation (111). In Comparative Example 2, since only a broad peak is present, it is inferred that the film is amorphous. In Example 2, a sharp peak derived from chromium was detected in addition to a broad peak, and thus it is inferred that the film contains both a crystalline material and an amorphous material. In addition, the crystallization rate in Examples 1 to 3 was from 5 to 26%, the crystallization rate in Comparative Example 1 was 100%, and the crystallization rat in Comparative Example 2 was 0%. These results showed that the hard trivalent chromium plating film of the present invention was a plating film containing both a crystalline material and an amorphous material, unlike the hard hexavalent chromium plating film and the conventional hard trivalent chromium plating film.

(Surface Roughness After Polishing)

The surface roughness ($R_z$) after polishing in Examples 1 to 3 was from 0.52 to 0.58 μm, the surface roughness in Comparative Example 1 was 0.42 μm, and the surface roughness in Comparative Example 2 was 0.79 μm. As a result, it was found that the surface roughness ($R_z$) of the hard trivalent chromium plating film of the present invention after polishing was higher than that of the hard hexavalent chromium plating film, but lower than that of the conventional hard trivalent chromium plating film.

(Hardness)

The hardness in Examples 1 to 3 was from 827 to 894 HV, the hardness in Comparative Example 1 was 974 HV, and the hardness in Comparative Example 2 was 919 HV. As a result, it was confirmed that the hardness of the hard trivalent chromium plating film of the present invention was 800 HV or greater which was slightly lower than the hardness of the hard hexavalent chromium plating film and the conventional hard trivalent chromium plating film, but could secure the abrasion resistance of the piston rod.

(Frictional Force)

The frictional force in Examples 1 to 3 was from 33.4 to 39.5 N, the frictional force in Comparative Example 1 was 47.3 N, and the frictional force in Comparative Example 2 was 70.6 N. As a result, it was found that the frictional force of the hard trivalent chromium plating film of the present invention was lower than that of the hard hexavalent chromium plating film and the conventional hard trivalent chromium plating film.

(Review of Results)

Figure 2:
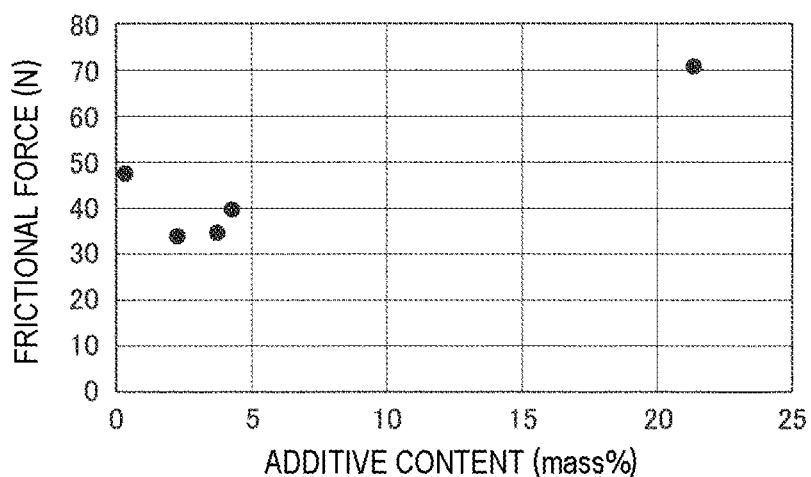
FIG. 2 is a graph illustrating a relationship between a frictional force of each test piece of Examples 1 to 3 and Comparative Examples 1 and 2 and an additive content in each chromium plating film.

The results of evaluating various characteristics of Examples 1 to 3 and Comparative Examples 1 and 2 will be considered. FIG. 2 is a graph illustrating the relationship between the frictional force and the additive content in each chromium plating film. As a result, the frictional force has a correlation with the additive content, and it can be confirmed that the additive content has a minimum value around approximately 2 to 3 mass %. Hence, it is suggested that there is an optimum value for the additive content in order to obtain a low frictional force.

Figure 3:
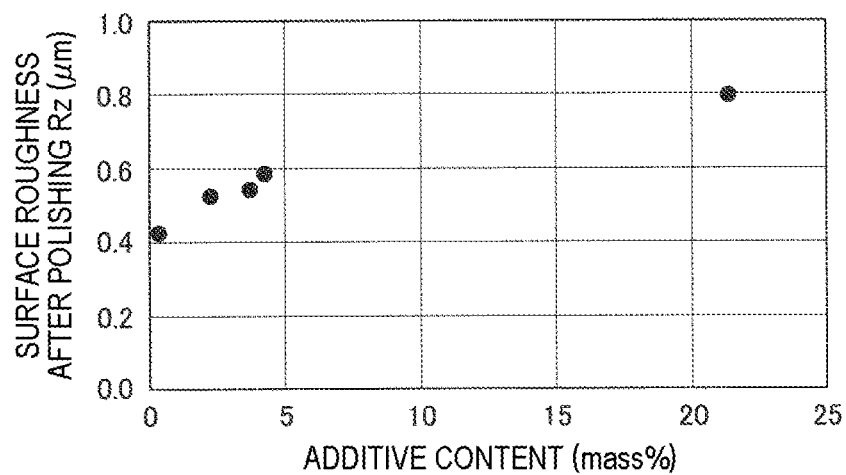
FIG. 3 is a graph illustrating a relationship between a surface roughness $R_z$ of each test piece of Examples 1 to 3 and Comparative Examples 1 and 2 and an additive content in each chromium plating film.

FIG. 3 is a graph illustrating the relationship between the surface roughness $R^z$ of each shock absorber after polishing and the additive content in each chromium plating film. As a result, it can be confirmed that the surface roughness ($R^z$) after polishing increases in proportion to the additive content. From the results of FIGS. 2 and 3, it is presumed that the frictional force tends to decrease as the additive content increases, whereas when the additive content increases, the surface roughness ($R^z$) after polishing increases, and thus, as reviewed with FIG. 2, there is an optimum value for the additive content in terms of the frictional force.

It is presumed that the cause of a reduction in frictional force due to the inclusion of the additive is that the additive causes chemical adsorption with the oil to improve the oil retention on the surface of the plating film. In addition, it is presumed that the cause of the decrease in surface roughness after polishing due to the increase in the additive content is that the additive inhibits polishing and reduces smoothness.

Figure 4:
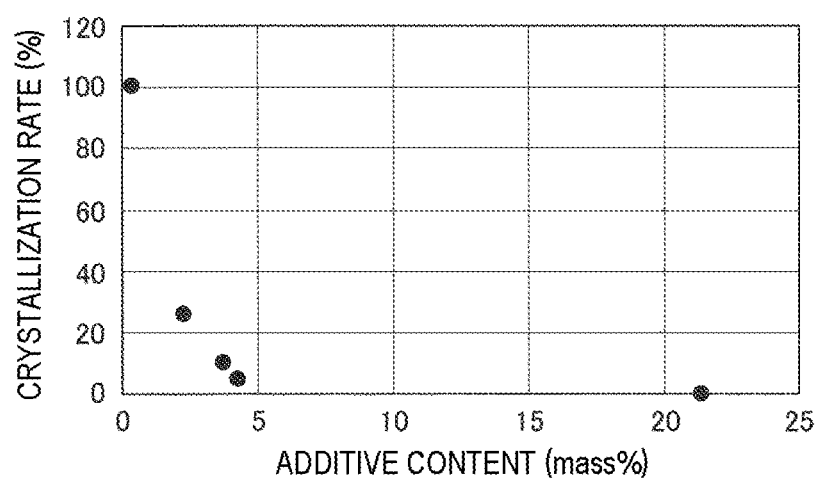
FIG. 4 is a graph illustrating a relationship between a crystallization rate of each test piece of Examples 1 to 3 and Comparative Examples 1 and 2 and an additive content of each chromium plating film.

FIG. 4 is a graph illustrating the relationship between the crystallization rate and the additive content of each chromium plating film. From this result, it was found that the crystallization rate decreased as the additive content increased, and when the additive content exceeded about 5 mass %, the film became amorphous. Hence, it is inferred that when the additive content is in a range of 5 mass % or less, there is a correlation between the crystallization rate and the additive content. From this result, it can be confirmed that the crystallization rate of the hard trivalent chromium plating film (additive content: from 2.3 to 4.3 mass %) capable of providing lower frictional force than that of the conventional hard hexavalent chromium is determined to be from 5 to 26%. It is presumed that the reason why there is a correlation between the crystallization rate and the additive content is that the additive decreases crystallinity.

Examples 4 and 5 and Comparative Examples 3 to 6

In the Examples, the crystallinity of the plating films was examined in a case where the current density was changed using two kinds of hard trivalent chromium plating baths having different pH values. Table 2 shows plating conditions of Examples 4 and 5 and Comparative Examples 3 to 6. In Examples 4 and 5 and Comparative Example 3, a plating bath containing glycine and having a pH of 0.1 was used, and the current density was from 40 to 400 A/dm². In Comparative Examples 4 to 6, a plating bath containing formic acid and having a pH of 5.5 was used, and the current density was from 40 to 400 A/dm². In this experiment, a copper plate was used as a substrate. The results are shown in Table 2.

TABLE 2

| | Example 4 | Example 5 | Comparative Example 3 | Comparative Example 4 | Comparative Example 5 | Comparative Example 6 |
|---|---|---|---|---|---|---|
| Components of plating bath | Trivalent chromium salt Carboxylic salt Conductive salt pH buffering agent | | | Trivalent chromium salt Carboxylic salt Conductive salt pH buffering agent | | |

TABLE 2-continued

|  | Example 4 | Example 5 | Comparative Example 3 | Comparative Example 4 | Comparative Example 5 | Comparative Example 6 |
|---|---|---|---|---|---|---|
| pH |  | 0.1 |  |  | 5.5 |  |
| Current density (A/dm$^2$) | 400 | 100 | 40 | 400 | 100 | 40 |
| Plating rate (μm/min) | 8 | 4 | 1 | 7.6 | 4.2 | 1 |
| Crystallinity | Crystallinity, amorphous | Crystallinity, amorphous | Amorphous | Amorphous | Amorphous | Amorphous |

Consequently, plating films containing both crystalline and amorphous materials were obtained in only Examples 4 and 5. In other words, it was found that the plating films containing both crystalline and amorphous materials could not be formed unless the current density was 100 A/dm$^2$ or greater in the plating bath containing glycine and having a pH of 0.1.

The results will be considered below. The conventional hard trivalent chromium plating film tends to be amorphous because the additive content increases. In general, it is considered that additives are less likely to be mixed into the plating film at a high current density. Therefore, it is presumed that in the hard trivalent chromium plating film under the high current density conditions, the additive content decreased and the crystallization rate improved. However, in the plating bath containing formic acid and having a pH of 5.5 in Comparative Examples 4 to 6, the film was amorphous even at a current density of 100 A/dm$^2$ or greater. Hence, it was suggested that the crystallization rate influenced the pH and the additive components of the plating bath, in addition to the current density conditions. This is presumed to be because the current density is a reduction rate factor in chromium ions, and the pH is a complexing factor in chromium ions.

As described above, according to the present invention, it has been demonstrated that it is possible to provide a shock absorber in which trivalent chromium is used to achieve both high hardness and low frictional force at a high level without using hexavalent chromium which is suspected of causing damage to the human body and the environment, and a method for manufacturing the shock absorber.

The present invention is not limited to the examples described above, and various modified examples are included.

The above-described examples have been described in order to explain the present invention in an easy-to-understand manner, and are not necessarily limited to those having all the configurations described. In addition, it is possible to replace a part of the configuration of a certain example with a configuration of other examples, and it is also possible to add a configuration of other examples to the configuration of a certain configuration. Furthermore, it is possible to add, eliminate, and replace other configurations with respect to a part of the configuration of each of the examples.

REFERENCE SIGNS LIST

100 shock absorber
1 cylinder
2 piston rod
3 hydraulic oil for hydraulic system
4 hard layer
5 piston
6 bottom valve
7 rod guide
8 oil seal
9, 10 damping force generating mechanism
11 outer cylinder
12 inner cylinder
A, B oil chamber
C reservoir chamber

The invention claimed is:

1. A shock absorber comprising:
a cylinder which is filled with hydraulic oil;
a piston rod which is movable in the cylinder; and
an oil seal which is fixed to the cylinder and slides on the piston rod,
wherein
a hard layer mainly containing chromium obtained from a trivalent chromium plating bath is provided on a surface of the piston rod,
the hard layer contains both a crystalline material and an amorphous material, and also contains an additive other than the chromium, and
the hard layer has a crystallization rate of 5 to 99%, as calculated from a peak integral intensity ratio of a value measured by X-ray diffraction and the following (Equation 1):

Crystallization rate(peak integral intensity ratio %)= (crystalline/(crystalline+amorphous))×100    (Equation 1).

2. The shock absorber according to claim 1, wherein the additive contains at least one element of hydrogen, carbon, nitrogen, or oxygen, and a content of the additive is 0.5 mass % or greater and 4.3 mass % or less.

3. The shock absorber according to claim 1, wherein the hard layer has a Vickers hardness HV of 800 HV or greater and a frictional force of less than 47.3 N.

4. The shock absorber according to claim 1, wherein the hard layer has a surface roughness Rz of 0.6 μm or less.

5. A method for manufacturing a shock absorber
the shock absorber including:
a cylinder which is filled with hydraulic oil;
a piston rod which is movable in the cylinder; and
an oil seal which is fixed to the cylinder and slides on the piston rod,
the method comprising a plating step of forming a plating film including a hard layer mainly containing trivalent chromium on a surface of the piston rod,
wherein the plating step is performed at a cathode current density of 100 A/dm2 or greater in a plating bath containing a trivalent chromium salt, a carboxylic acid, a pH buffering agent, and a conductive salt and having a pH of ≤0.1.

6. The shock absorber according to claim 2, wherein the hard layer has a Vickers hardness HV of 800 HV or greater and a frictional force of less than 47.3 N.

7. The shock absorber according to claim 2, wherein the hard layer has a surface roughness Rz of 0.6 μm or less.

8. The shock absorber according to claim 6, wherein the hard layer has a surface roughness Rz of 0.6 μm or less.

\* \* \* \* \*